United States Patent Office 2,972,959
Patented Feb. 28, 1961

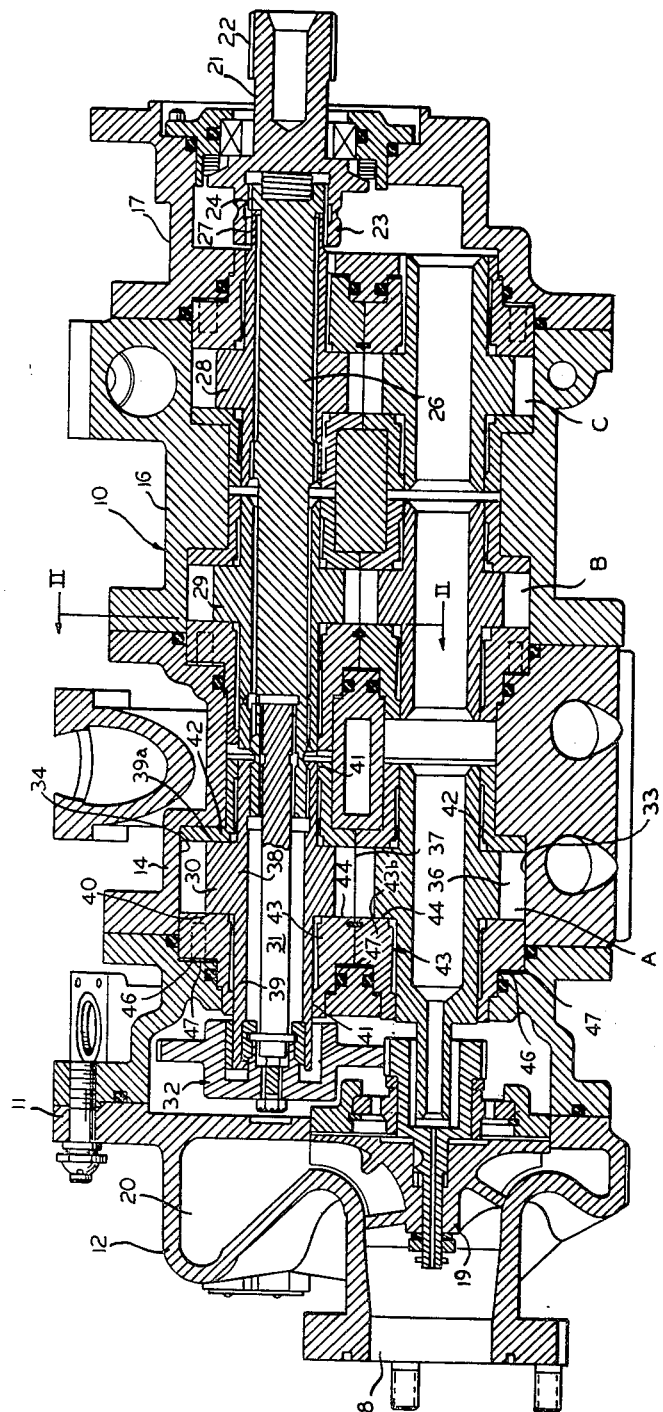

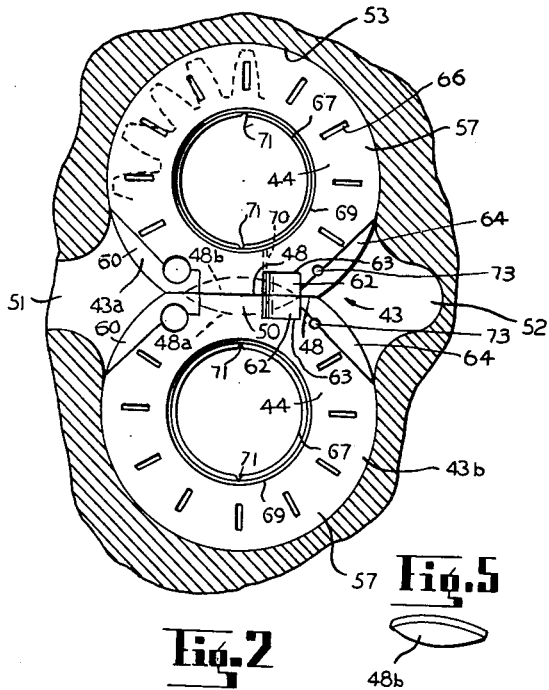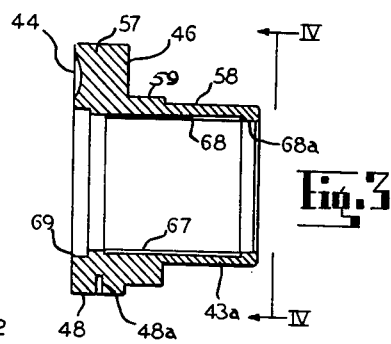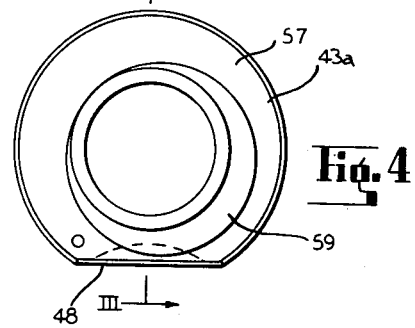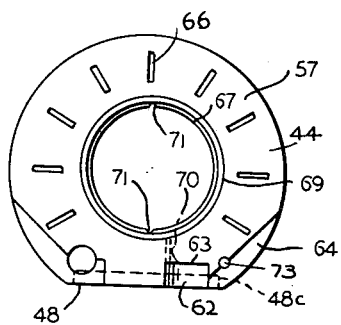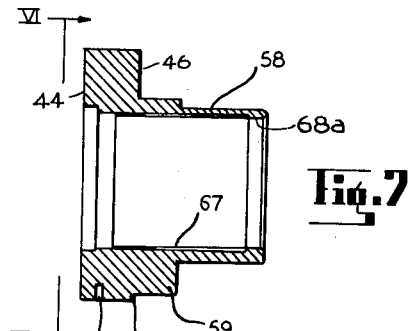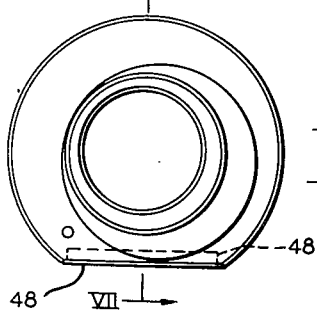

1

2,972,959
BEARING PLATE FOR PRESSURE LOADED GEAR PUMPS

Robert W. Wilson, Euclid, and Joseph H. Brettnacher, Painesville, Ohio, assignor to Thompson Ramo Wooldridge Inc., a corporation of Ohio Filed Mar. 26, 1957, Ser. No. 648,627

12 Claims. (Cl. 103—126)

This invention relates generally to pressure-loaded gear pumps and more particularly to an improved pressure-loaded bushing assembly including a pair of movable bushings construction whereby pumping efficiency is improved and the need for close production tolerances across adjacent bearing flats is obviated.

Briefly described, the present invention relates to specific improvements in the structural and functional characteristics of a movable pressure-loaded bushing assembly used to seal against confronting adjoining side faces of a pair of intermeshing rotary gears, the bushing assembly providing bearing journalling surfaces for supporting one end of the shafts of the rotary gears in a pump housing. Gear pumps generally utilize a pair of intersecting bores formed by a pump housing to provide a pumping cavity. The intermeshing gears rotate within the pumping cavity to move fluid by positive displacement from an inlet on one side of the cavity to an outlet at the other side of the cavity. Pressure-loaded movable bushings are employed to seal one side of the cavity, the other side of the cavity being sealed by stationary bushings or by an appropriately constructed portion of the pump housing. The pressure-loaded bushing is usually subjected to fluid at pump generated pressure so that a continuous biasing force urges the bushings into proper sealing relationship with the adjoining side faces of the rotary gears. Each of the bushings has a flat chordal section which in operative position is in abutting relation each to the other.

The present invention contemplates the provision of barrier means interposed between and extending across the flat surfaces presented by the chordal sections to preclude the loss of pressure fluid across these bearing flats. By this arrangement, a pump may be operated efficiently even at flow conditions which prevail at "cranking" speeds. Moreover, pumps considered as marginal production pumps may be made efficient for normal operation. In the present instance this means takes the form of a key or plate which is operative to prevent rotation of the bushings during operation of the pump, to minimize cocking or lifting of the bushings and to afford more even floating of the bushings under pressure. The use of the key or plate eliminates the need for close production tolerances across the flat surfaces at the bushings and the need for precise hand fitting of the bushings. Moreover, time-consuming finishing of the bushing flats may be eliminated and the bushings may be machine-sized before installation, only a slight lapping of the bushing flat to remove burrs being required. Also, the need for squaring the sealing faces with the flats is precluded.

A primary object of the invention is, therefore, to provide an improved pressure-loaded movable bushing assembly for a pressure-loaded gear pump.

Another object of the invention is to provide an improved bushing assembly for a pressure-loaded gear pump of the type having chordal bearing flats in which slow leakage across the flats is reduced to a minimum.

A further object of the invention is to provide a pressure-loaded bushing assembly for a pressure-loaded gear pump which is characterized by a high level of efficiency even at "cranking" flow conditions.

Another object of the invention is to provide a pressure-loaded bushing assembly for a pressure-loaded gear pump by means of which the efficiency of even marginal production pumps may be substantially increased.

Still another object of the invention is to provide a pressure-loaded bushing assembly of the stated type in which cocking or lifting of the bearings is precluded and in which the bearings float more evenly more pressure.

Another object of the invention is to provide a gear pump having a pressure-loaded bushing assembly of the mentioned type in which the need for close production tolerances and precise hand fitting of the bushings is obviated.

A further object of the invention is to provide a gear pump having a pressure-loaded bushing assembly of the stated type in which the several bushings may be machine sized before installation and in which the need for squaring the sealing faces with the flats is eliminated.

Many other features, advantages and additional objects of the present invention will become manifest to those versed in the art upon making reference to the detailed description which follows and the accompanying sheets of drawings in which a preferred structural embodiment of a pressure-loaded gear pump incorporating the principles of the present invention is shown by way of illustrative example.

On the drawings:

Figure 1 is an elevational sectional view showing a multiple gear pump embodying pressure-loaded bushing assemblies made in accordance with the principles of the present invention;

Figure 2 is a fragmentary sectional view taken substantially on line II—II of Figure 1;

Figure 3 is an elevational sectional view of a bushing forming a part of the pressure-loaded bushing assembly of the present invention and taken substantially on line III—III of Figure 4;

Figure 4 is an end elevational view taken substantially on line IV—IV of Figure 3;

Figure 5 is a view in perspective of a key or plate forming a part of the pressure-loaded bushing assembly of Figure 2;

Figure 6 is an elevational view of a bushing forming a part of a pressure-loaded bushing assembly made in accordance with a modified form of the present invention taken substantially on line VI—VI of Figure 7;

Figure 7 is an elevational sectional view taken substantially on line VII—VII of Figure 8;

Figure 8 is an end elevational view of the bushing of the modified form of the present invention taken as viewed from the right in Figure 7; and Figure 9 is a view in perspective of a key or plate forming a part of the invention shown in Figure 6.

As shown on the drawings:

The pressure-loaded gear pump of the present invention has utility in a wide variety of pumping mechanisms. In the present instance, however, illustrative embodiments of the present invention are shown in conjunction with a multiple pump generally indicated by reference numeral 10 which comprises a housing 11 formed by a plurality of connected pump units identified from left to right in Figure 1 by reference numerals 12, 13, 14, 16 and 17.

Section 12 in the form of the invention shown is a centrifgual pump unit and includes an inlet 18 through which fluid may be fed to an impeller 19 for raising the pressure of the fluid to a predetermined level. The fluid is discharged through a volute chamber 20 at a positive inlet pressure to three gear pump units indicated at A, B and C.

The rotary fluid displacement means of the gear units A, B and C and the centrifugal impeller 19 are driven by a common shaft 21 splined as at 22 for connection to a suitable power source and having a collar portion 23 internally splined as at 24 to a shaft 26 and splined as at 27 to a driver gear 28 forming a part of the gear unit C.

The shaft 26 extends through the driving gear 28 as well as through a driver gear 29 forming a part of the gear unit B, there being provided appropriate connections to effect rotation of the driver gear 29 and a driver gear 30 forming a part of the gear unit A.

At the left end of the shaft 26, as viewed in Figure 1, there is connected a shaft 31 which is coupled by means of a speed proportioning means identified generally by the reference numeral 32 to the centrifugal impeller 19 so that the impeller 19 may be rotated at a proportionally higher speed than the driver and driven gears of the gear units A, B and C.

For purposes of the present disclosure, each of the gear units A, B and C are essentially identical and, accordingly, further description of the detailed components of each of the gear units A, B and C will utilize common reference numerals wherever possible. Each of the respective pump sections is so formed and shaped to provide in conjunction with an adjacent section, a pair of intersecting bores 33 and 34 which cooperate to form a pumping cavity in which the intermeshing driver and driven gears are rotated for functioning as a rotary fluid displacement means, thereby moving fluid from an inlet on one side of the pumping cavity to an outlet on the other side of the pumping cavity.

The driver and driven gears have a plurality of circumferentially spaced teeth 36 with spaces therebetween. These spaces are filled with fluid at the inlet side of the pump and carry the fluid around the outside of the pumping cavity toward the outlet side of the pump so that the pressure of the fluid at the outlet side is increased. It will be appreciated that this pressure increase is effected since passage of fluid through the gears at the point of intermesh indicated generally by reference numeral 37 is not possible.

Each gear unit has a hub portion indicated by reference numeral 38 and a shaft portion indicated at 39. The hub 38 not only provides the gear teeth 36 but has on opposite sides thereof gear side faces identified as 39a and 40 respectively. The shaft portions 39 of each of the driver and driven gears, including the gear 30, extend on the axes of rotation of gears outwardly from the gear side faces 39a and 40. The outer peripheral surfaces of the shaft portions 39 constitute bearing and journalling surfaces indicated at 41.

Each of the side faces 39a on the respective gear members engages confronting sealing face of a stationary bushing indicated at 42.

Engaging each of the side faces 40 of the driver and driven gears of each gear unit is a pressure-loaded movable bushing assembly indicated generally at 43. Each of the assemblies 43 includes a bushing 43a and a bushing 43b which form backing plates for the pumping cavity. Each of the bushings 43a and 43b has a front sealing surface 44 for engaging the confronting side face 40 of its associated gear in sealing relation and a pressure-receiving back face 46 which, together with means including the housing 11, forms pressure control chambers indicated at 47. The pressure control chambers 47 are placed in pressure communication with the gear pump outlet by a means hereafter described, so that pressure-receiving back face 46 is loaded to provide a continuous biasing force urging the bushings 43a and 43b axially into sealing engagement with the confronting side face of its associated gear.

Referring now more particularly to Figures 2–5 inclusive, the improved structural characteristics of the pressure-loaded movable bushing assembly 43 will be described in detail. Each of the bushings 43a and 43b is generally circular in overall configuration, thus conforming generally in shape to the bores 34 and 33 forming the pumping cavity. Each of the bushings 43a and 43b of the assembly 43 has a chordal flat surface 48 which in the operative position of the assembly shown in Figure 2 are in parallel abutting relation. It will be noted in Figure 1 that the chambers 47 intersect at the point of abutment of the two surfaces 48. According to the present invention, means are provided to prevent the loss of flow of pressure fluid across the flat surfaces 48. In the preferred form of the invention, a pair of complementary arcuate recesses 48a are formed in the surfaces 48 of the bushings 43a and 43b in spaced relation to the sealing faces 44. In the assembled position of the bushings these recesses are in register each with the other to form a chamber 50. Mounted within the chamber 50 is a key or plate 48b having arcuate side edges corresponding to the configuration of the recesses 48a. By this arrangement, flow leakage from the chamber 47 to the pumping cavity is prevented, the need for close production tolerances across the abutting surfaces 48 is eliminated, rotation of the bushings during operation of the pump is prevented, cocking or lifting of the bushings is obviated and the bushings are allowed to float more evenly under pressure.

We claim as our invention:

1. A gear pump comprising a housing having a cavity, an inlet and an outlet for said cavity, a pair of rotary gears rotatably mounted in said cavity in intermeshing relation, said cavity being defined in part by a pair of movable pressure-loaded bushings having radial sealing faces complementary to the adjacent gear faces and complementary flat mating contact surfaces on said bushings adjacent the area of intermesh of the gears, and barrier means for preventing the flow of pressure fluid between said bushings across said flat surfaces, said barrier means comprising a separate insert member received in and filling recesses open only to said flat surfaces and spaced inwardly from all other surfaces of the bushings at the margins of said flat surfaces.

2. In a high pressure gear pump comprising a housing having a cavity, an inlet and an outlet for said cavity, a pair of rotary gears rotatably mounted in said cavity in intermeshing relation, a pair of pressure-loaded bushings for said gears, said bushings having axial flat mating surfaces in confronting relation adjacent the gear intermesh, the improvement comprising barrier means wholly confined in said bushings at said flat mating surfaces and extending substantially thereacross from the inlet side to the outlet side of said axial flat mating surfaces for preventing the leakage of pressure fluid, said barrier means comprising a separate insert member received in and filling recesses open only to said flat surfaces and spaced inwardly from all other surfaces of the bushings at the margins of said flat surfaces.

3. In a pump, a casing having a pumping chamber with an inlet and an outlet, rotary fluid displacement means in said chamber moving fluid from the inlet to the outlet, and end plate means provided with a radial sealing surface for engaging and sealing against an adjoining side face of said rotary fluid displacement means, said end plate means comprising a pair of generally cylindrical members each having a chordal section provided with axial flat abutment surfaces confronting and engaging one another adjacent the gear intermesh, and sealing means intersecting said chordal sections and spaced inwardly from all other surfaces of the end plate means at the margins of said chordal section abutment surfaces to prevent the loss of pressure fluid across said abutment surfaces.

4. In a pump as defined in claim 3, said sealing means including a recess wholly confined interiorly of the margins of each abutment surface and a key member received in both of said recesses.

5. In a pump as defined in claim 4, said key and said recesses in said abutment surfaces being of complementary rectangular configuration.

6. In a pump as defined in claim 4, said key and said recesses in said abutment surfaces being of complementary arcuate configuration.

7. A gear pump comprising a housing having a cavity, an inlet and an outlet for said cavity, a pair of rotary gears rotatably mounted in said cavity in intermeshing relation, said cavity being defined in part by a pair of movable pressure-loaded bushings having radial sealing faces complementary to and engaging the adjacent gear faces, said bushings further including mated axial surfaces adjacent the area of intermesh of the gears, means extending substantially across said axial surfaces from the inlet to the outlet side of the pump for preventing the flow of pressure fluid between said bushings across said flat surfaces, said means including an arcuate recess open in each of said flat surfaces and spaced inwardly from all other surfaces of the bushings, and a plate received in said recesses, said plate having arcuate edges conforming generally to the configuration of said recesses.

8. In a gear pump having a cavity, an inlet and an outlet for said cavity, a pair of gears rotatably mounted in said cavity in intermeshing relation, a pair of pressure-loaded bushings journaling one side of said gears, said bushings defining said cavity in part and being movable by pressure fluid into sealing relation to said gears, said bushings having mating axial flat portions in confronting relation each to the other adjacent the intermesh of the gears, the improvements comprising barrier means confined in said bushings in said flat portions and extending substantially thereacross from the inlet to the outlet side of the pump to prevent leakage of pressure fluid said barrier means comprising a separate insert member received in and filling recesses open only to said flat portions and spaced inwardly from all other surfaces of the bushings at the margin of said flat portions.

9. A gear pump comprising a casing having a pumping chamber formed with an inlet and an outlet, rotary intermeshing gears in said pumping chamber moving fluid from said inlet to said outlet, and a bushing for each gear provided with a generally cylindrical portion forming a sealing face engaging an adjoining gear side face, said sealing face characterized by the provision of a plurality of circumferentially spaced radially extending recesses of smaller width than an adjoining tooth space and being disposed radially outwardly of the root diameter of the adjoining teeth so that the adjoining gear teeth will wipe pumping fluid accumulated in said recesses across the sealing surface for lubrication and cooling thereof, said cylindrical portion of said bushing having a flat chordal portion engaging a corresponding flat chordal portion of an adjoining bushing adjacent the area of intermesh of said rotary gears, and sealing means confined in and between said flat chordal portions of said bushings to preclude the loss of pressure fluid across said flat chordal portions, said sealing means including a recess open only to said flat chordal portions of the bushing and spaced inwardly of all other surfaces of the bushing.

10. A gear pump as defined in claim 9, said sealing means comprising a tongue interposed between said bushings and extending substantially from the inlet to the outlet side of the bushings, and a pair of recesses wholly confined within the flat chordal portions inwardly of the margins thereof, there being one recess formed in each bushing for receiving and seating said tongue.

11. A gear pump as defined in claim 10, said tongue and recesses being of generally rectangular configuration.

12. A gear pump as defined in claim 10, said tongue and recesses being of generally arcuate configuration.

References Cited in the file of this patent

UNITED STATES PATENTS

| | | |
|---|---|---|
| 621,280 | Pitt | Mar. 14, 1899 |
| 1,451,859 | Balcker | Apr. 17, 1923 |
| 1,475,683 | Carrey | Nov. 27, 1923 |
| 1,795,579 | Storey | Mar. 10, 1931 |
| 1,861,708 | Miki | June 7, 1932 |
| 2,400,485 | Cardillo | May 21, 1946 |
| 2,420,622 | Roth et al. | May 13, 1947 |
| 2,446,194 | Samiran | Aug. 3, 1948 |
| 2,649,740 | Murray et al. | Aug. 25, 1953 |
| 2,706,452 | Hilton | Apr. 19, 1955 |
| 2,756,681 | Oliver | July 31, 1956 |

FOREIGN PATENTS

| | | |
|---|---|---|
| 244,826 | Italy | Feb. 27, 1926 |

UNITED STATES PATENT OFFICE
Certificate of Correction

Patent No. 2,972,959                                                              February 28, 1961

Robert W. Wilson et al.

It is hereby certified that error appears in the above numbered patent requiring correction and that the said Letters Patent should read as corrected below.

Column 4, between lines 28 and 29, insert the following:

As shown in FIGURE 2, the gear pumping unit shown includes an inlet section 51 and an outlet section 52 on opposite sides of a pumping cavity 53.

Each of the bushings 43a and 43b has a flange portion 57 and a tubular extension 58. The tubular portion 58 and the flange 57 and the corresponding recesses formed in the pump housing 11 for receiving the same are concentric to the axis of the bushing and the corresponding gear.

There is provided directly adjacent the pressure-receiving back surface 46 of the flange 57 an annular shoulder 59 which is eccentrically offset relative to the bushing axis towards the inlet side of the pump and functions to reduce the total effective area of the back surface 46 towards the inlet side of the pump. Thus, unequal pressure forces developed in the pumping cavity 53 are resisted by similarly offset forces produced on the pressure-receiving back face 46 because the centroid of pressure is shifted to afford a balanced loading of the bushings 43a and 43b.

To assist in filling the spaces between the teeth of the gears and to otherwise minimize erosion resulting from cavitation, each sealing surface 44 is relieved at 60, at the inlet side. The relieved area 60 extends substantially tangentially of the flange 57 and radially inwardly a sufficient distance so that it lies adjacent the tooth spaces of the adjoining gear.

At the outlet side of the bushings 43a and 43b are formed trapping relief recesses 62. The recesses 62 are semicylindrical in configuration and are defined by end walls 63. Extending generally tangentially with respect to the periphery of the flange 57 and outwardly away from the trapping relief recess 62 is an additional relieved area such as a chamfered portion indicated at 64 forming a second recess means for improving flow characteristics at the outlet area of the pump.

Each surface 44 is further characterized by the provision of a plurality of circumferentially spaced radially extending arcuate recesses 66. The recesses 66 are preferably narrow slots arcuate in cross-sectional configuration to facilitate convenient formation, for example, by a milling cutter or some equivalent machine tool. The innermost portion of each recess 66 is preferably near the root diameter of the gear teeth and the outermost portion is inwardly of the periphery of the teeth. The recesses 66 form pockets which retain fluid being pumped and as each gear tooth passes an adjoining pocket, the wiping action carries fluid across the sealing surface 44 of the bushing to assist in cooling and lubricating the same. Such provision, of course, is of particular utility as applied to high speed pump apparatus.

The bushings are each provided with a centrally disposed bore 67 having a tapered cylindrical wall portion 68 and terminating in an end portion 68a. The bore 67 is progressively counterbored as at 69 and 69a adjacent the point of juncture of the shaft 39 and the hub portion 38 of the corresponding gear and inwardly adjacent thereto. Thus the counterbore 69 affords a clearance which tends to avoid binding and seizure between the bushings 43a and 43b and the corresponding gears and which assists in the supply of coolant and lubricant for the bearing and journaling surfaces. The second counterbore 69a provides an area of smaller diameter thereby forming a restriction relative to the counterbore 69 and assisting in maintaining a progressive pressure drop between the counterbore 69, the counterbore 69a and the tapered bore 68.

There is further provided between the trapping relief 62 and the counterbore 69 a separate passage 70 providing communication between the pump outlet and the counterbore 69.

The tapered portion 68 is also provided with one or more grooves 71 communicating at one end with the counterbore 69 to assist in flooding the bearing surfaces with lubricant and coolant. The shoulder between the counterbore 69 and 69a and the effective radial area between the counterbore 69a and the end portion 68a are subjected to the pressures adjacent thereto, thereby tending to balance the load on the bushing.

To establish communication between the outlet of the pump and the chambers 47, each of the flanges 57 is provided with an axially extending passage 73 opening into the front and rear faces 44 and 46. By this arrangement fluid at pressures generated by the pump is supplied to the back surface 46 forming one wall of the pressure control chambers 47.

Referring now to FIGURE 6, there is shown in this figure a modified form of the present invention in which a substantially rectangular slot 48c is formed in the surface 48 for reception of a rectangular key or plate 60, shown in perspective in FIGURE 9. It will be appreciated that a slot such as 48c is formed in each of the bushings 43a and 43b of the bushing assembly 43. The key or plate 60 functions in the same manner as the key 48b.

Although various minor structural modifications might be suggested by those versed in the art, it should be understood that we wish to embody within the scope of the patent warranted hereon all such modifications as reasonably and properly come within the scope of our contribution to the art.

Signed and sealed this 8th day of May 1962.

[SEAL]

Attest:
ERNEST W. SWIDER,
*Attesting Officer.*

DAVID L. LADD,
*Commissioner of Patents.*